May 4, 1965  A. ANGIOLETTI  3,181,531
RUBBER GAS MASK

Filed March 29, 1961  4 Sheets-Sheet 2

INVENTOR
*Attilio Angioletti*

BY *Stevens, Davis, Miller + Mosher*
ATTORNEYS

May 4, 1965     A. ANGIOLETTI     3,181,531
RUBBER GAS MASK

Filed March 29, 1961     4 Sheets-Sheet 3

INVENTOR
*Attilio Angioletti*

BY
*Stevens, Davis, Miller + Mosher*
ATTORNEYS

May 4, 1965  A. ANGIOLETTI  3,181,531
RUBBER GAS MASK

Filed March 29, 1961  4 Sheets-Sheet 4

INVENTOR
*Attilio Angioletti*

BY *Stevens, Davis, Miller + Mosher*
ATTORNEYS

_United States Patent Office_

3,181,531
Patented May 4, 1965

3,181,531
RUBBER GAS MASK
Attilio Angioletti, Milan, Italy, assignor to
Pirelli S.p.A., Milan, Italy
Filed Mar. 29, 1961, Ser. No. 99,299
Claims priority, application Italy, Apr. 1, 1960, 5,706/60
2 Claims. (Cl. 128—141)

The present invention relates to rubber masks for protection against poisonous gases, and, in particular, it concerns those masks in which the exhalation space has a considerably reduced size.

In rubber gas masks of the type designed for the protection of the entire face of the user from poisonous gases, the space (sometimes referred to as the "noxious space") wherein the exhaled air was collected to be expelled from the mask was heretofore limited to that of a small rubber chamber applied inside the facepiece and intended only to protect the nose and mouth of the user. Filtered air would enter the mask, passing through the space between the facepiece and the small rubber chamber, against the glasses of the eyepieces to prevent their misting and, finally, this air was led into the small rubber chamber to be inhaled.

To the present time, this small chamber was separately prepared by molding and was joined to the facepiece in a position corresponding to the location of the exhaust valve and corresponding to the location of any device which might be desired for placing said rubber chamber into direct communication with the outside, as for instance the phonic device.

In view of the many functions performed by, or through this small chamber, the size of the chamber would be necessarily larger than would otherwise be desired. Correspondingly, its weight would be somewhat more excessive than might be desired. Finally, in the light of the above, and in light of the need for providing isolation between the various functions performed by, or through, this small chamber, it was necessary heretofore to employ complicated molds for the fabrication of the small chamber, the mask, and the means for securing the various parts together.

The principal object of the present invention is to provide a gas mask which will eliminate the above-mentioned difficulties.

According to the present invention, as will more clearly appear hereinafter, the mask is molded as a single piece of rubber. The upper portion of the facepiece is provided with a single eye window. A transverse diaphragm extends upwardly and inwardly from the base of the eye window covering the bridge of the nose and bearing against the cheeks of the user, the space below this transverse diaphragm constituting the exhalation space. The central portion of the mask is provided with a circular seat to which a phonic device is attached as desired. Below the seat for the phonic device is a circular opening constituting a seat for the filter and the one-way inlet valve. Two lateral inhalation ducts in the interior of the mask communicate with the lower inlet opening and pass around the central seat up into the chamber between the eye window and the transverse diaphragm. Said ducts specifically serve to direct the filtered air against the glass of the eye window in order to prevent its misting. The filtered air then passes from the last-mentioned space through a plurality of holes in the bottom of the transverse diaphragm into the exhalation space for utilization by the user. The facepiece of the gas mask is also provided with two outlet openings spaced on opposite sides of the central seat, these outlet openings constituting seats for the exhaust valves. Thus, the only portion of the mask of the present invention which has a double wall is that portion which corresponds to the inhalation ducts.

The method of making the mask of the present invention involves the molding, in a single piece, by injection of rubber at a temperature ranging from 130° to 160° C. and at a pressure from 200 to 500 kg./cm.$^2$. This operation will take place in a closed mold including removable inner parts, that is, two parts corresponding to the cavities of the mask existing above and below the transverse diaphragm, respectively, and a fork for forming the two lateral inhalation ducts.

Therefore, an important object of the present invention is to provide a mask of the above type which can be molded in a single piece.

Another object of the present invention is to provide a mask of the type described above wherein a considerable reduction of the total weight of the mask is obtained.

A further object of the present invention is to provide a mask which is simpler and easier to manufacture.

A still further object of the present invention is to provide a process for manufacturing a mask of the type described herein.

Other and further objects and advantageous features of the present invention will hereinafter more fully appear in connection with a detailed description of the drawings in which.

Figure 1:
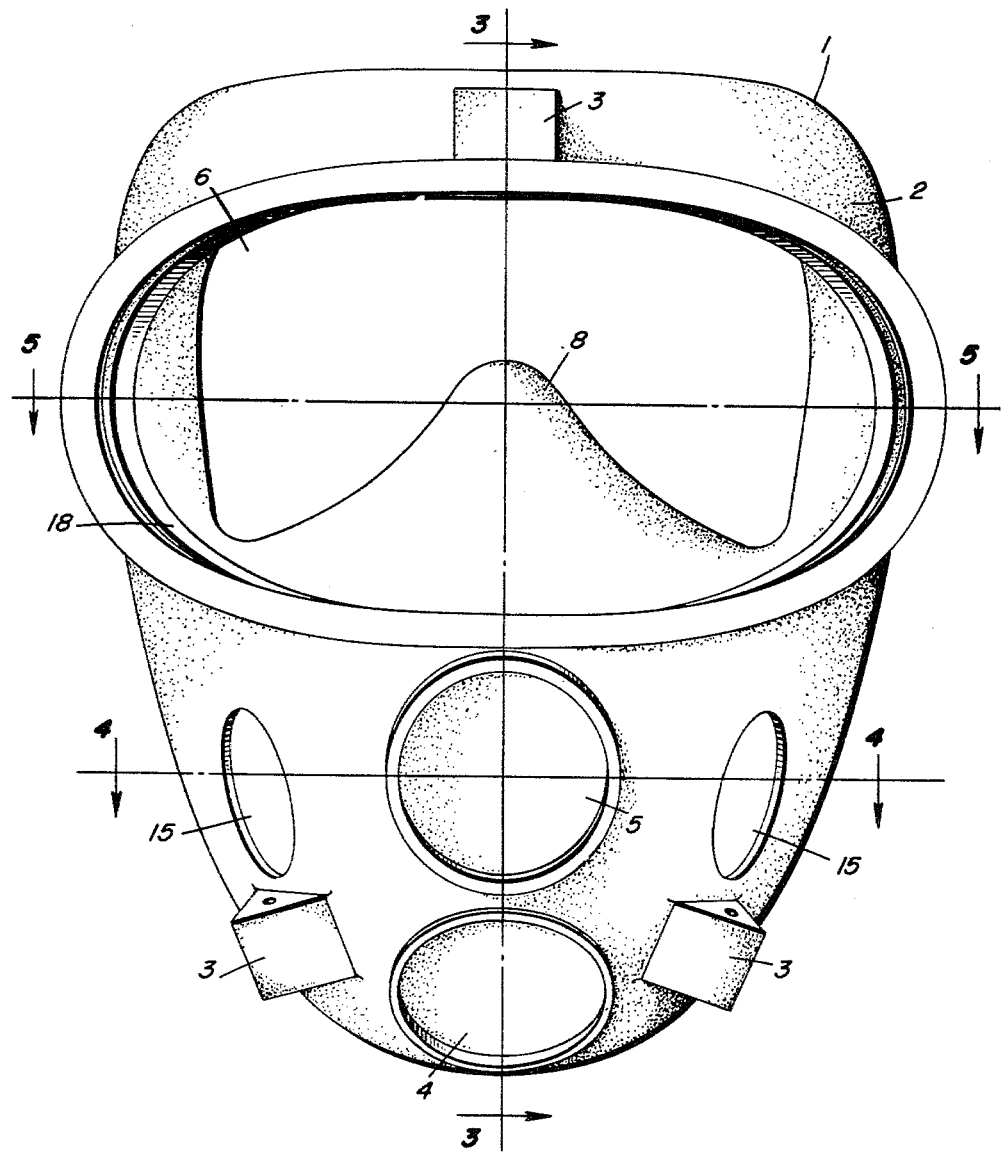
FIGURE 1 is a front elevation of a mask constructed in accordance with the present invention.
Figure 2:
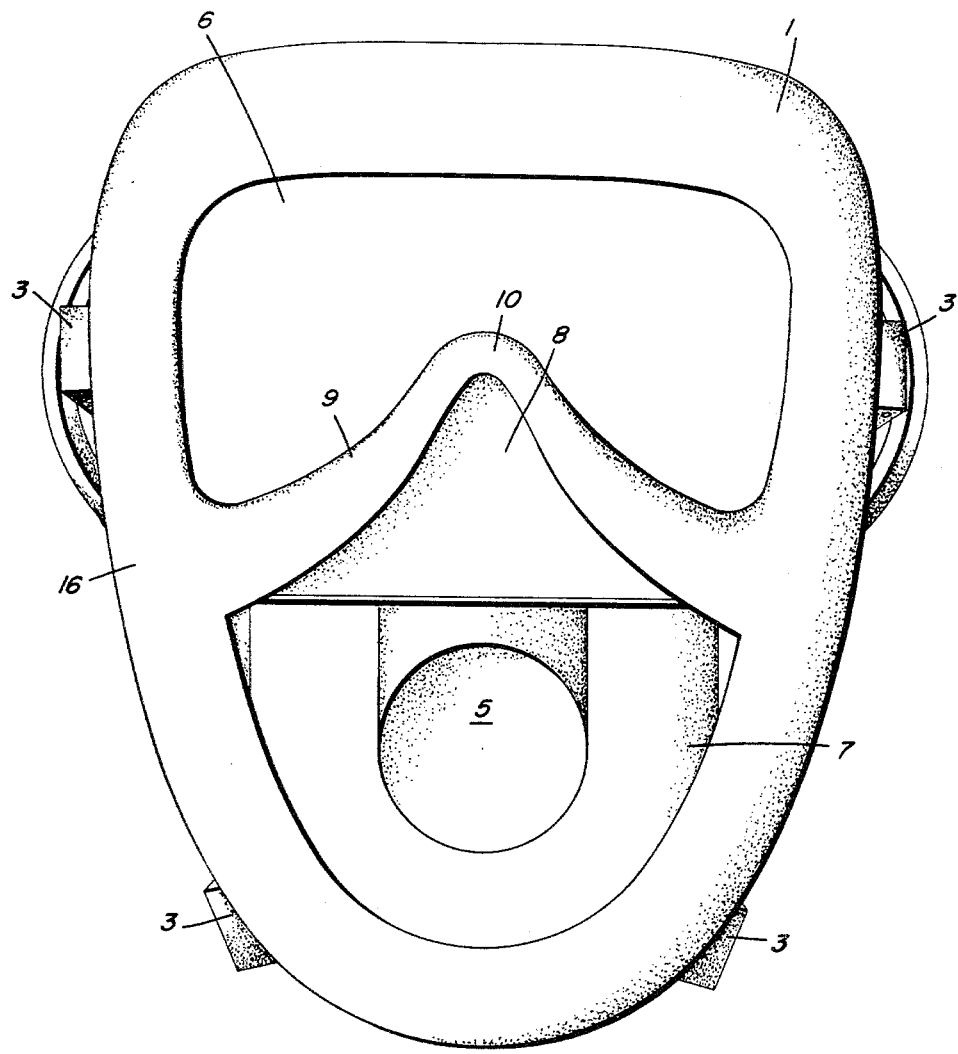
FIGURE 2 is a rear elevation of the mask shown in FIGURE 1.
Figure 3:
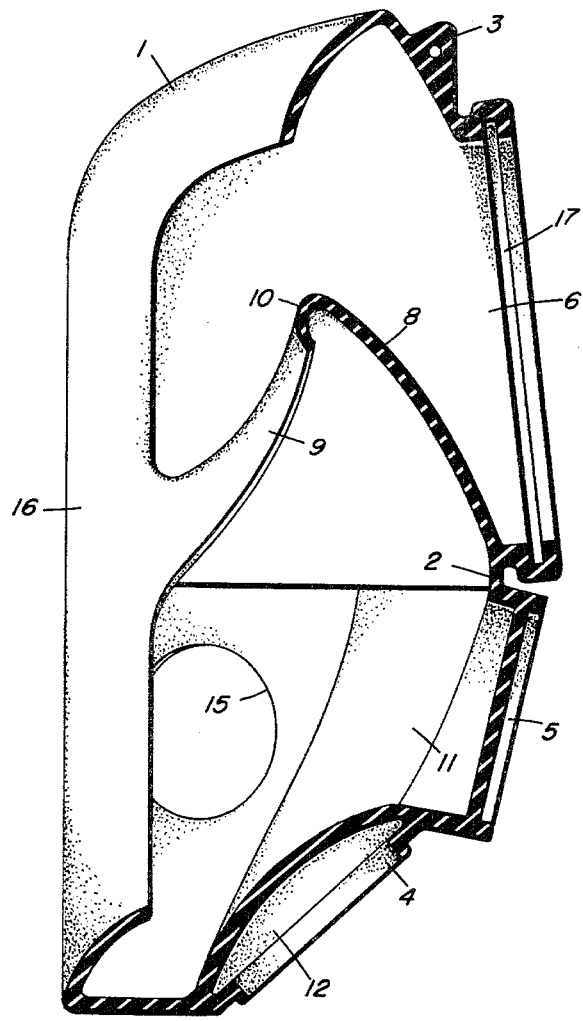
FIGURE 3 is a vertical section, taken along section line 3—3 of FIGURE 1 showing details of the internal construction of the mask of FIGURE 1.
Figure 4:
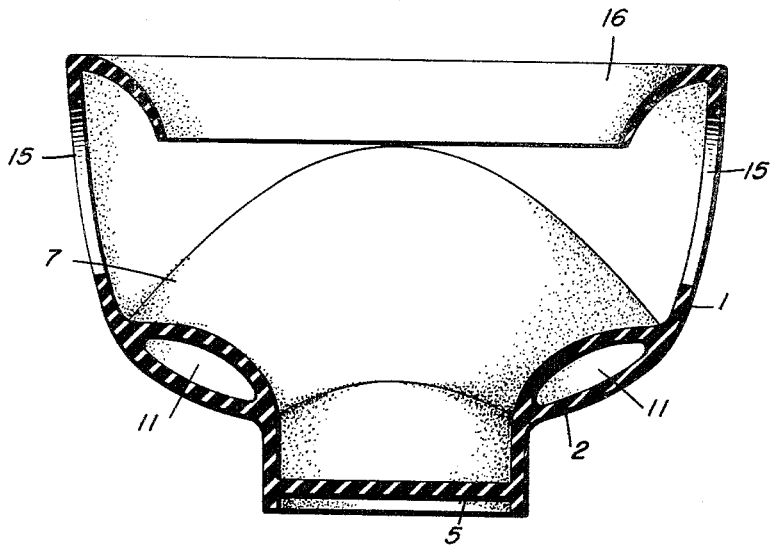
FIGURE 4 is a transverse cross-sectional view taken along section line 4—4 of FIGURE 1 showing details of the lower portion of the mask.
Figure 5:
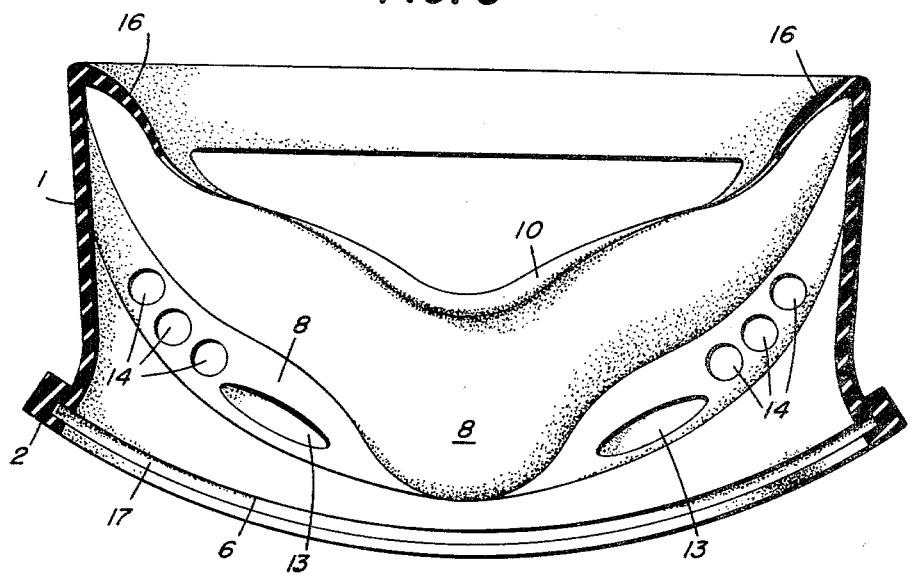
FIGURE 5 is a transverse cross-sectional view taken along section line 5—5 of FIGURE 1 showing details of the upper portion of the mask.

Referring to the drawings in detail, there is shown a rubber gas mask 1 having a facepiece 2 and being provided with projections 3, the latter constituting attachments for the belt harness (not shown). The facepiece is provided with a circular inlet opening 4 constituting a seat for the attachment of a filter (not shown) and a one-way inlet valve (not shown). A circular seat 5 is located in the lower central portion of the facepiece, this seat being provided for the attachment of a phonic device (not shown). The upper portion of the facepiece is provided with a large window 6, the latter being enclosed by a glass 17 (see FIGURES 3 and 5). Two circular outlet openings 15 are located on the sides of the facepiece on opposite sides of the seat 5. These outlet openings 15 constitute seats for the attachment of two exhaust valves (not shown).

Adjacent the base 18 of the window 6, a diaphragm 8 projects upwardly and inwardly towards the face of the user. The edges of the diaphragm are folded inwardly such that the lateral folded edges 9 bear against the user's cheekbones and the folded apex portion 10 engages the bridge of the user's nose.

A rubber sheet or vertical diaphragm 7 having a semicircular shape is fastened against the inside of the facepiece so as to surround the seat 5 and so as to cover the inlet opening 4. Thus, the semi-circular sheet or vertical diaphragm 7 and the adjacent facepiece 2 form two lateral inhalation ducts 11 which communicate with a central space 12 adjacent the inlet opening 4. The lateral ducts 11 terminate at their upper ends in openings 13 on the flat portion of the transverse diaphragm 8 so as to provide communication between the central space 12 and the space adjacent the eye window. Said flat portion is provided with a plurality of lateral holes 14 which permit passage of the filtered air into the space beneath the transverse diaphragm 8 surrounding the nose and mouth of the user.

The peripheral edge 16 of the gas mask is turned inwardly so as to facilitate engagement of the mask with the face of the user.

The above described gas mask will be provided with a belt harness (not shown) for attaching the mask to the head of the user; a filter (not shown) and a one-way inlet valve (not shown) which will be attached to the opening 4 so as to enclose the central space 12; a phonic device which can be attached to the seat 5; and exhaust valves (not shown) which are attached to the circular openings 15.

The operation of the mask will now be described:

During the inhalation phase, the reduction of air pressure within the interior of the mask will open the inlet valve (not shown) such that air passes through the filter (not shown) through the opening 4 and into the central space 12. The filtered air passes through the two inhalation ducts 11 through the openings 13 and into the space enclosed by the glass 17. After circulating adjacent the glass 17, the air passes downwardly through the holes 14, thus reaching the mouth and nose of the user.

During the exhalation phase, the lateral exhaust valves (not shown) which are connected to the outlet openings 15 and which are directly disposed on the facepiece are opened while the inlet valve (not shown) is closed. The resistance offered by the exhaust valves to the outflow of exhaled air is so low that essentially the entire amount of exhaled air is released through these exhaust valves; therefore, the amount of exhaled air which passes upwardly through the holes 14 is very small.

The mask described above is particularly suitable for industrial uses.

In the present invention, the exhalation space has been reduced by disposing the transverse diaphragm 8 in its lowest possible position. This diaphragm 8 merely carries the holes 14 for communication between the exhalation space and the inlet system. If it had been necessary to provide this diaphragm with efficient inlet valves, the diaphragm would have had to be larger and would have had to be disposed in a higher position. Thus, with the transverse diaphragm being located in its lowest possible position, the large remaining portion of the facepiece permits the employment of a single eye window of satisfactory size.

The process of the present invention involves injecting rubber at a temperature ranging between 130° and 160° C. under a pressure of 200 to 500 kg./cm.² into a closed mold. The mold includes removable inner parts, that is, two parts corresponding to the cavities of the mask existing above and below the transverse diaphragm 8, respectively, and a fork intended to form the lateral inhalation ducts 11 and the central space 12.

Whereas, the present invention has been described in particular relation to the drawings attached hereto, it should be understood that other and further modifications, apart from those shown or suggested herein, may be made within the spirit and scope of this invention.

What is claimed is:

1. In a rubber gas mask molded in a single piece comprising a facepiece adapted to cover and bear against portions of the face of the user, said facepiece having a centrally disposed seat adapted to receive a phonic device and a pair of outlet openings, said seat communicating with the exhalation space, each said outlet opening communicating with the exhalation space and being disposed upon an opposite side of said seat, said facepiece having an eye window in its upper portion and an inlet seat in its lower portion adapted to receive a filter and an inlet valve, a transverse diaphragm disposed within the inner confines of said facepiece and extending upwardly and inwardly relative to the bottom portion of said eye window, said transverse diaphragm having a rearmost edge adapted to fit against the user's face and a forward edge contiguous the bottom portion of said eye window, and a substantially vertical diaphragm disposed adjacent the inner and forward surface of said facepiece and below said eye window and extending downwardly from the forward edge of said transverse diaphragm to the lower edge of said facepiece, said vertical diaphragm forming with the adjacent portions of the inner surface of said facepiece a central space and a pair of inhalation ducts, said ducts being in communication with said central space, said vertical diaphragm being substantially U-shaped and positioned with its legs of the U shape contiguous and around said centrally disposed phonic seat such that each of said pair of inhalation ducts are disposed on opposite sides and next to said centrally disposed phonic seat, said transverse diaphragm having two openings located at said forward edge of said transverse diaphragm each in communication with one of said inhalation ducts, said transverse diaphragm further defining a first and second plurality of holes therein located at said forward edge of said transverse diaphragm, said first and second plurality of holes communicating with the exhalation space of the mask, said first and second plurality of holes being disposed on either side of said two openings.

2. The article defined by claim 1, the peripheral edge of said facepiece being turned inwardly so as to facilitate engagement of the facepiece with the face of the user.

References Cited by the Examiner

UNITED STATES PATENTS

| 1,762,695 | 6/30 | Monro | 128—141 |
| 2,238,492 | 4/41 | Leguillon | 128—141 |
| 2,359,506 | 10/44 | Battley et al. | 128—141 |
| 2,536,120 | 1/51 | Beare | 18—55 |
| 2,670,502 | 3/54 | Cox | 264—305 |
| 2,671,933 | 3/54 | Nye | 18—55 |
| 2,835,250 | 5/58 | Austin | 128—141 |
| 2,910,979 | 11/59 | Shanty et al. | 128—141 |

FOREIGN PATENTS

| 312,594 | 5/29 | Great Britain. |

RICHARD A. GAUDET, *Primary Examiner.*

RICHARD J. HOFFMAN, *Examiner.*